United States Patent [19]
Langley et al.

[11] Patent Number: 6,031,030
[45] Date of Patent: Feb. 29, 2000

[54] PRODUCTION PROCESS

[75] Inventors: Robert Langley, Glasgow; Paul Kerwin, Renfrewshire; Arthur Stark Walls, Kilmarnock; Kenneth Grant Dykes, Glasgow, all of United Kingdom

[73] Assignee: Ciba Speicialty Chemicals Corporation, Tarrytown, N.Y.

[21] Appl. No.: 09/078,929

[22] Filed: May 14, 1998

[30] Foreign Application Priority Data

May 15, 1997 [GB] United Kingdom .................... 9709762

[51] Int. Cl.⁷ .............................. C08K 5/34; C09B 67/50
[52] U.S. Cl. .......................... 524/88; 106/287.2; 106/410
[58] Field of Search ........................... 524/88; 106/287.2, 106/410

[56] References Cited

U.S. PATENT DOCUMENTS

| | | | |
|---|---|---|---|
| 4,257,951 | 3/1981 | Matrick | 260/314.5 |
| 4,522,654 | 6/1985 | Chisvette et al. | 106/288 |
| 5,712,332 | 1/1998 | Kaieda et al. | 524/88 |

FOREIGN PATENT DOCUMENTS

| | | |
|---|---|---|
| 1224627 | 3/1971 | United Kingdom . |
| 1402011 | 8/1975 | United Kingdom . |
| 95/17473 | 6/1995 | WIPO . |

*Primary Examiner*—Kriellion Sanders
*Attorney, Agent, or Firm*—Kevin T. Mansfield; David R. Crichton

[57] ABSTRACT

A process for the preparation of a paint concentrate which comprises (a) milling or acid pasting a crude metal phthalocyanine to reduce the particles size thereof, thereby forming a modified crude metal phthalocyanine and (b) kneading a mixture of the modified crude metal phthalocyanine together with a paint vehicle comprising one or more paint solvents, the metal phthalocyanine being present in an amount of 20 to 80% by weight of the kneaded mixture, to give a paint concentrate containing the metal phthalocyanine in pigmentary form dispersed in the paint vehicle.

20 Claims, No Drawings

PRODUCTION PROCESS

This invention relates to a process for the production of a paint concentrate, i.e. a dispersion of an organic pigment in a paint vehicle, particularly an automotive or architectural paint vehicle, comprising a solvent and, optionally, other components such as a binder and additives, which dispersion contains 20–80% by weight of the pigment and can be "let down", i.e. diluted, to give a final paint by the addition of further paint vehicle.

Conventional processes for the production of paints or paint concentrates containing metal phthalocyanine pigments have required the crude metal phthalocyanine to be subjected either to prolonged grinding in a ball mill or kneader in the presence of an inorganic salt or dissolution and reprecipitation from concentrated sulphuric acid, known as acid pasting, followed by further conditioning and isolation to convert the crude metal phthalocyanine into a pigmentary form, which is then dispersed, usually with further grinding, in a paint vehicle.

It has now surprisingly been found that paint concentrates containing a pigmentary metal phthalocyanine can be obtained without the need for prolonged grinding and without the need to use specialised dispersing and fluidising agents by firstly either acid pasting or milling crude metal phthalocyanine to reduce its particle size and then kneading the smaller particles of crude metal phthalocyanine together with a solvent component of the paint and, optionally, a binder component of the paint. Possible environmental problems associated with the use of an inorganic salt grinding aid can thereby be avoided and the overall processing time required to progress from crude metal phthalocyanine to paint concentrate can be considerably reduced. Paints having excellent dispersion, strength, gloss and flow properties can be obtained from the resulting concentrates.

Accordingly, the present invention provides a process for the preparation of a paint concentrate which comprises (a) milling or acid pasting a crude metal phthalocyanine to reduce the particle size thereof, thereby forming a modified crude metal phthalocyanine, and (b) kneading a mixture of the modified crude metal phthalocyanine together with a paint vehicle comprising one or more paint solvents, the metal phthalocyanine being present in an amount of 20 to 80% by weight of the kneaded mixture, to give a paint concentrate containing the metal phthalocyanine in pigmentary form dispersed in the paint vehicle.

The milling step (a) is preferably carried out in a ball mill, although other grinding apparatus having a similar effect, for example an attritor, can be used if desired. In the milling step, the crude metal phthalocyanine is preferably in admixture with a resin and/or an organic liquid. The resin may be a resin conventionally used as a resin or binder component of a paint concentrate, or a resin compatible with such a component and other components of the paint concentrate to be produced. Examples of suitable resins, where the paint concentrate to be produced is an oil-based concentrate, are Alkyds of variable oil length, both modified and non modified, Acrylics, Cellulosics, Epoxies, alone or as esters, Melamines, Phenolics, Polyesters, Polyurethanes, Rosins, Maleic or Phenolic modified Rosins, Silicones, Styrene containing resins e.g. Alkyds, Methacrylates and Polyesters, Urea nased resins and Vinyls e.g. PolyVinyl Acetates or Chlorides.

Where the paint concentrate to be produced is an aqueous concentrate, Alkyds noth modified and non modified, Polyesters, Acrylics, Vinyls e.g. PolyVinyl Acetate and Syrene containing e.g. Styrene-Butadiene.

Where a resin is used in the milling step (a), it is usually in particulate form.

Organic liquids suitable for use in the milling step (a) may be those conventionally used as a solvent component of a paint concentrate, or a liquid compatible with such a component. The liquid may be a material which is solid at ambient temperature but is liquid at the elevated temperature resulting from the milling process. Suitable liquids include Aliphatic compounds such as White Spirit, Alcohols and Carboxylic Acids; Aromomatic compounds such as Toluene and Xylene which may be blended with other compatible liquids/solvents; Esters such as e.g. Ethyl, Methyl or Butyl Acetates; Ketones such as Acetone, MethylEthyl Ketone and Methyl-isoButyl Ketone; Ethers or Ether Alcohols such as Diethyl Ether, Diethylene Glycol and Butyl Glycol; or blends of various aliphatic/aromatic hydrocarbons and alcohols e.g. Xylene:Butanol.

A fluidising agent may be milled together with the crude metal phthalocyanine in the milling step (a). Suitable fluidising agents include salts of long chain aliphatic amines, e.g. those having one or more chains of at least 10 carbon atoms, e.g. 10 to 20 carbon atoms, with a sulphonated metal phthalocyanine, especially sulphonated copper phthalocyanine and basic metal phthalocyanines such as dimethylaminoethyl copper phthalocyanine.

The modified crude metal phthalocyanine produced by the milling step (a) generally has particle sizes from 5 to 50 microns, compared with about 10 to 100 microns for the crude phthalocyanine before milling. The percentage of the phthalocyanine in the beta crystal form is generally reduced by the milling, although to a lesser extent when an organic liquid is milled with the phthalocyanine. The milled product generally has the characteristics of a ball milled intermediate.

If the modified crude metal phthalocyanine is produced by acid pasting, an essentially 100% alpha crystal form is obtained.

Where a resin is used in the milling stage (a), it may be used generally in an amount of 0.1 to 50%, preferably 2 to 30%, especially 5 to 15%, by weight of the crude metal phthalocyanine. When an organic liquid is used in the milling stage (a) it is used in an amount, generally 0.1 to 20% by weight of the crude phthalocyanine, such that the product of the milling stage (a) is in particulate form, not caked or wet form.

The kneading step (b) of the process of the invention may be carried out in a batch kneader or, preferably, an extruder, especially a twin-screw extruder which may have, for example, 1 to 30 mixing zones, more usually 3 to 20 mixing zones. The modified crude metal phthalocyanine obtained by step (a) may be fed to an extruder in admixture with the paint vehicle, or the paint vehicle may be fed separately to the extruder. The paint vehicle may consist wholly of an organic liquid as hereinbefore described as suitable for use in milling step (a), i.e. a liquid conventionally used as a solvent component of a paint concentrate or a liquid compatible with such a component, where such liquid is a liquid at ambient temperature. Alternatively, the paint vehicle may comprise one or more paint solvents, for example one or more organic liquids as hereinbefore described, optionally together with one or more paint binders and, optionally also, other known components of paint vehicles such as conventional additives.

In one preferred embodiment of step (b) the modified crude metal phthalocyanine obtained by step (a) is fed to an extruder together with an organic liquid such as one or more of those hereinbefore described as usable in step (a). In another preferred embodiment, the modified crude metal phthalocyanine obtained by step (a) and the organic liquid are fed separately to the extruder. In both embodiments, any remaining part of the vehicle is preferably supplied to the extruder through one inlet before the, or the first, mixing zone.

The paint solvent component of the paint vehicle may be used in step (b) in an amount of 0.1 to 100%, preferably 15 to 50% by weight, based on the weight of the metal phthalocyanine. The temperature at which the kneading step (b) is carried out, e.g. the barrel temperature of the extruder, may be generally from 20 to 200° C., preferably from 50 to 150° C. The shear gradient applied to the materials to be extruded may be adjusted by adjusting the screw speed. This shear gradient is generally from 300 to 20,000 $s^{-1}$, preferably 500 to 5000 $s^{-1}$.

The nature of the solvent, binder and other components of the paint vehicle is determined generally by the type of paint concentrate which it is desired to produce. The process of the invention may be used to produce concentrates for paints of various types, for example architectural, decorative, general industrial and automotive paints which may be based on organic or aqueous solvents.

Amongst the solvents which may be used are one or more of the solvents listed above for use in milling step (a).

Amongst the binders which may be used are one or more of the resins listed above for use in milling step (a).

Examples of other known components of paint vehicles which may be kneaded with the phthalocyanine in step (b) or added during subsequent processing of the paint concentrate are Pigments e.g. $TiO_2$ and Fe Oxides, Surfactants e.g. polysiloxanes, Extenders, fillers, Levelling agents, Gloss enhancing agents, Rheology control agents, Fluidising agents such as those given above for use in milling step (a), Wetting/Dispersing agents e.g. anionic, nonionic or cationic agents, Stabilisers, Defoamers/Deaerators, and Antiflooding/floating agents e.g. Silicone Oil, Castor Oil fatty acids and Soya Lecithin.

In the kneading step (b), the relative amounts of the modified crude metal phthalocyanine from step (a) and the paint vehicle with which it is kneaded may be such that the kneaded mixture, and therefore the paint concentrate produced, contains from 20 to 80%, preferably 30 to 70%, especially 40 to 60%, by weight of metal phthalocyanine. The product of the kneading step is a paint concentrate containing the metal phthalocyanine in pigmentary form. The concentrate may be let down, ie. diluted, with further paint vehicle to give a final paint or an intermediate let-down product which can be supplied as a feeding stock to a paint maker and further diluted with paint vehicle to give the final paint. The let-down of the concentrate can be carried out using conventional procedures.

The process of the invention is particularly useful for the preparation of paint concentrates where the metal phthalocyanine is copper phthalocyanine, but may also be used for the production of paint concentrates containing other metal phthalocyanines, for example zinc or nickel phthalocyanine, or, especially, chlorinated and/or brominated copper phthalocyanine.

The process of the invention may be used to produce paint concentrates for paints of various types, including architectural, decorative, general industrial and automotive paints.

The invention is illustrated by the following Examples, in which parts and percentages are by weight, unless otherwise specified.

EXAMPLE 1

8570 g of crude phthalocyanine (CuPc) and 430 g of a phenolic modified hard rosin are placed in a revolving ball mill and ground for 5 hours to give a ball milled intermediate (BMI). The crystal form of the milled intermediate is 48% alpha. The BMI is supplied to a co-rotating twin screw extruder (MP 2030 type of APV, Newcastle-under-Lyme, UK) together with cetyl alcohol such that the CuPc to cetyl alcohol ratio is 3:1. The total powder feed rate is 0.9 $Kghr^{-1}$. A paint varnish consisting of approximately 5 parts melamine rosin, 8.3 parts xylene/butanol 70:30 mix and 1.7 parts short oil alkyd resin is supplied as a liquid to the extruder before the first mixing zone, through one inlet only, at a rate of 0.6 $Kghr^{-1}$. The barrel temperature of the extruder is set at 30° C. and the screw speed is set at 500 rpm, resulting in an applied sheer gradient of 1674 $s^{-1}$. The discharge temperature of the concentrate is 30° C. The resulting paint concentrate has a pigmentary CuPc content of 43% by weight and is predominantly in the Beta modification.

What is claimed is:

1. A process for the preparation of a paint concentrate which comprises
    (a) milling or acid pasting a crude metal phthalocyanine to reduce the particles size thereof, thereby forming a modified crude metal phthalocyanine; and
    (b) kneading a mixture of the modified crude metal phthalocyanine together with a paint vehicle comprising one or more paint solvents or resins, the metal phthalocyanine being present in an amount of 20 to 80% by weight of the kneaded mixture, to give a paint concentrate containing the metal phthalocyanine in pigmentary form dispersed in the paint vehicle.

2. The process of claim 1, in which the milling step (a) is carried out in a ball mill.

3. The process of claim 1, in which in milling step (a) the crude metal phthalocyanine is in admixture with a resin or an organic liquid or a resin and an organic liquid.

4. The process of claim 1 in which the resin is an alkyd, acrylic, cellulosic, epoxy, melamine, phenolic, polyester, polyurethane, silicone, styrene-containing, urea, or vinyl resin.

5. The process of claim 3 in which the organic liquid is an aromatic solvent, white spirit, an alcohol, carboxylic acid, ester, ketone, ether or ether alcohol or mixtures thereof.

6. The process of claim 3 or 4 in which the resin is used in an amount of 0.1 to 50% by weight, based on the weight of the crude metal phthalocyanine.

7. The process of claim 3 or 5, in which organic liquid is used in an amount of 0.1 to 20% by weight, based on the weight of the crude metal phthalocyanine.

8. The process of claim 1, in which the kneading step (b) is carried out in a twin-screw extruder.

9. The process of claim 8, in which the modified crude metal phthalocyanine is fed to the extruder together with an organic liquid useable in the milling step (a) or the modified crude metal phthalocyanine and said organic liquid are fed separately to the extruder.

10. The process of claim 8, in which the extruder has one or more mixing zones and the remaining part of the paint vehicle is supplied to the extruder through one inlet before or in the first mixing zone.

11. The process of claim 1, in which the kneading step (b) is carried out at 20 to 200° C.

12. The process of claim 1, in which the kneading step (b) is carried out at 50 to 150° C.

13. The process of claim 1, in which a shear gradient from 300 to 20,000 $s^{-1}$ is applied during the kneading step (b).

14. The process of claim 1, in which the kneaded mixture contains 30 to 70% by weight of metal phthalocyanine.

15. The process of claim 14, in which the kneaded mixture contains 40 to 60% by weight of metal phthalocyanine.

16. The process of claim 1, in which the paint vehicle also contains a binder and, optionally, one or more additives.

17. The process of claim 1, in which the metal phthalocyanine is copper phthalocyanine.

18. The process of claim 17, in which the copper phthalocyanine is chlorinated.

19. The process of claim 18, in which the copper phthalocyanine contains 1–20% chlorine.

20. A paint produced by diluting a paint concentrate obtained by a process according to any of the preceding claims with a paint vehicle comprising one or more paint solvents.

* * * * *